Jan. 23, 1940. H. A. OSBORNE 2,188,205
FLOATING TOOL HOLDER
Filed Sept. 30, 1937 4 Sheets-Sheet 2
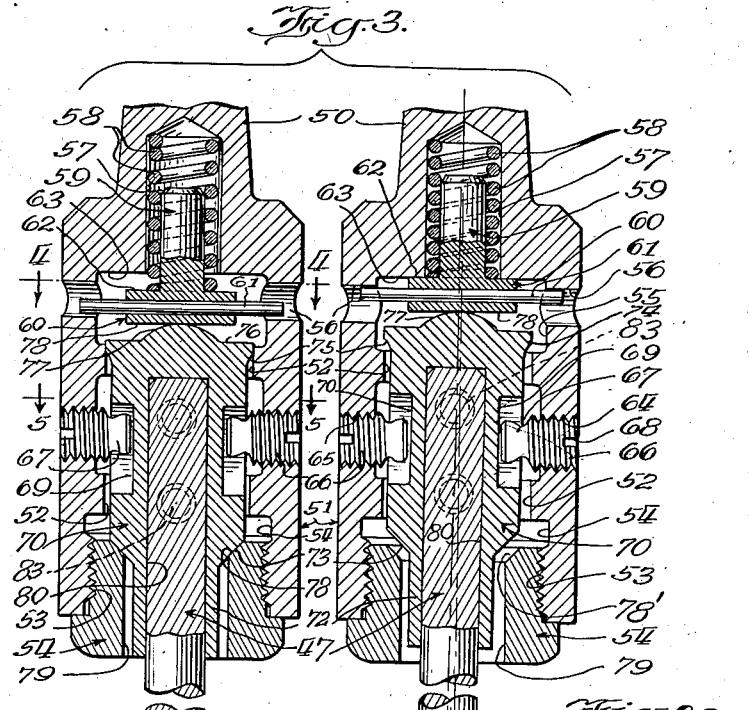
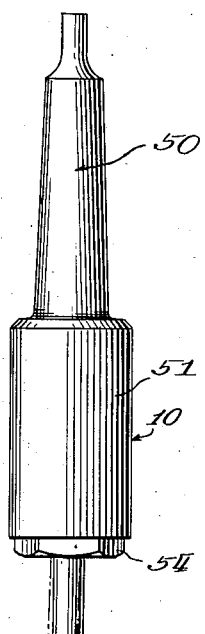
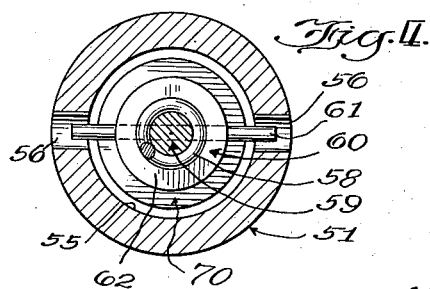
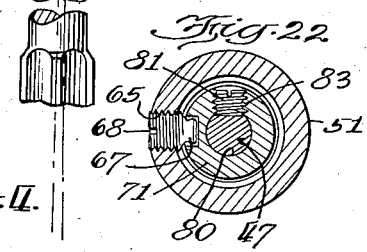
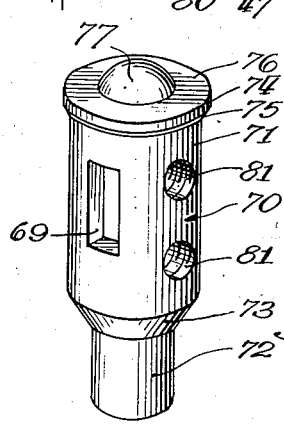
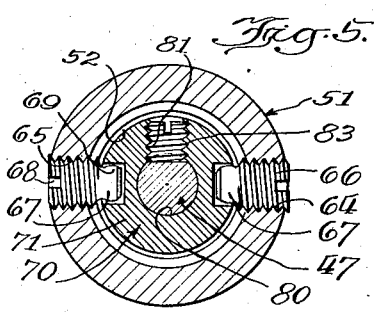
Inventor:
Horace A. Osborne
By
Williams, Bradbury, McCaleb & Hinkle
Attys.

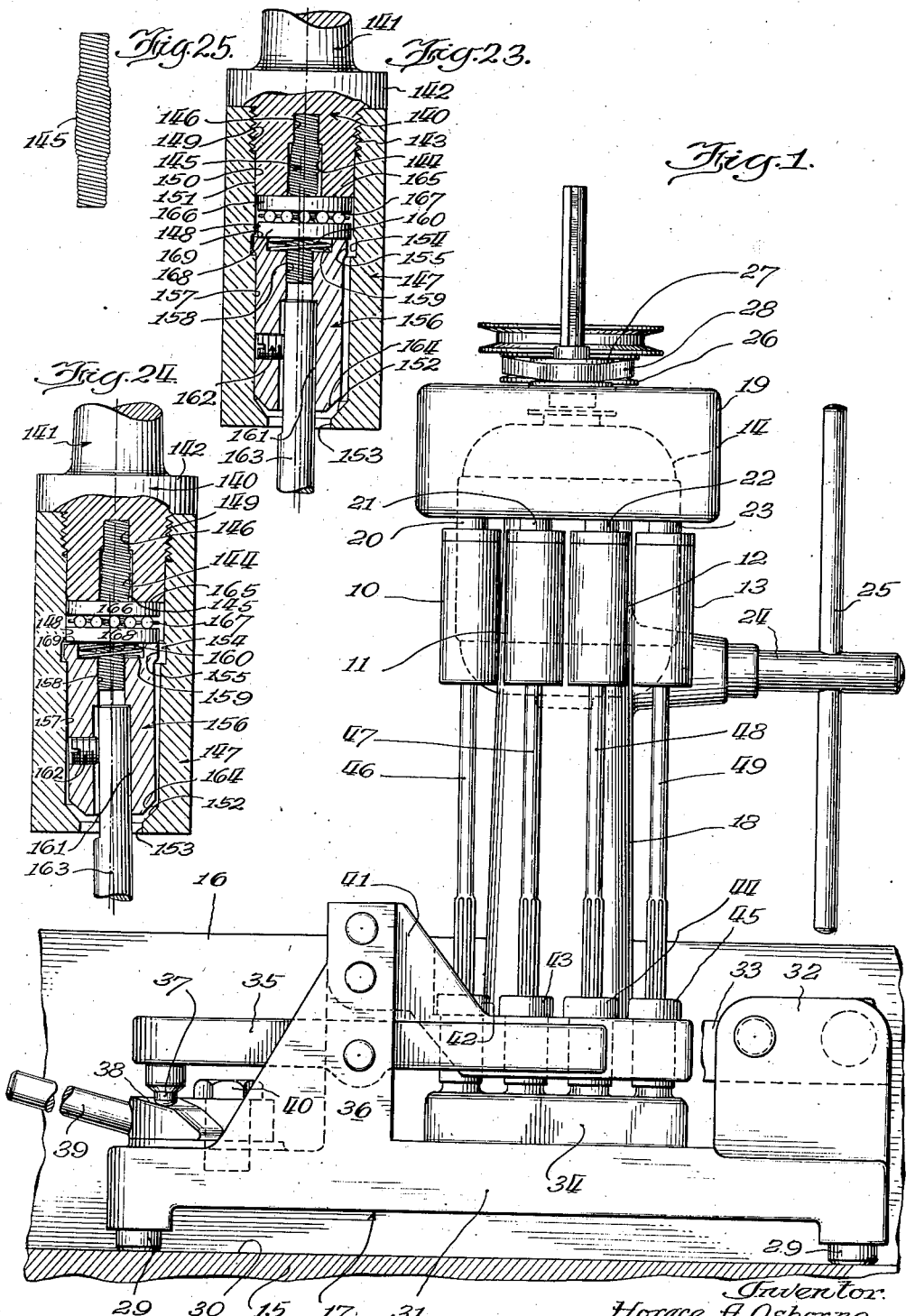

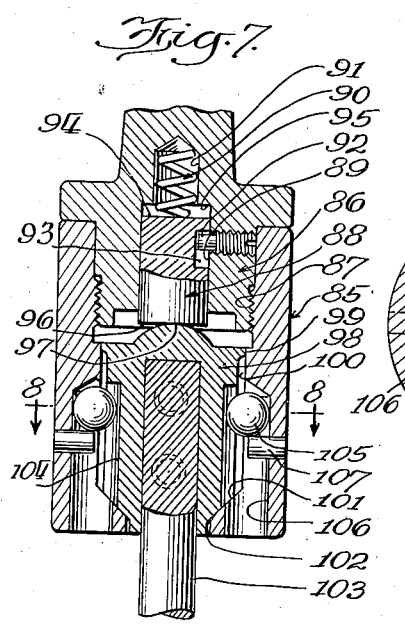
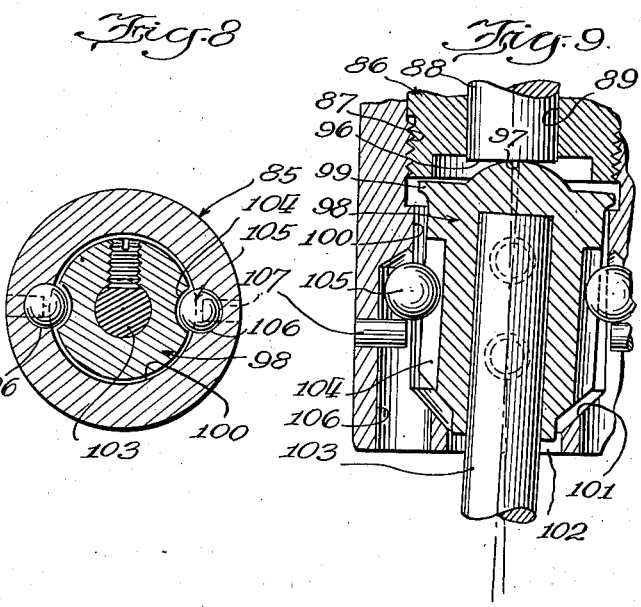
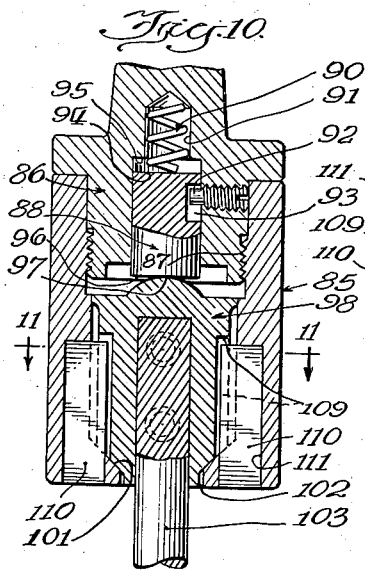
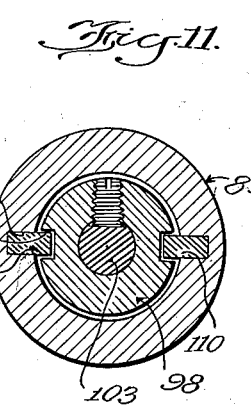
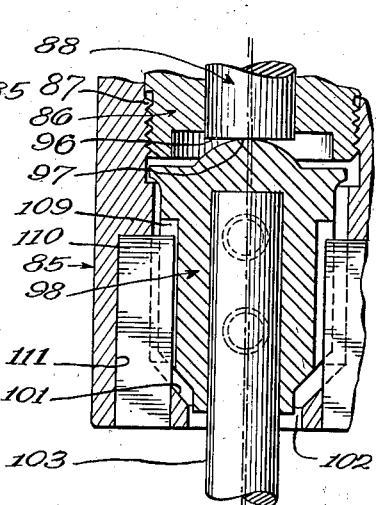

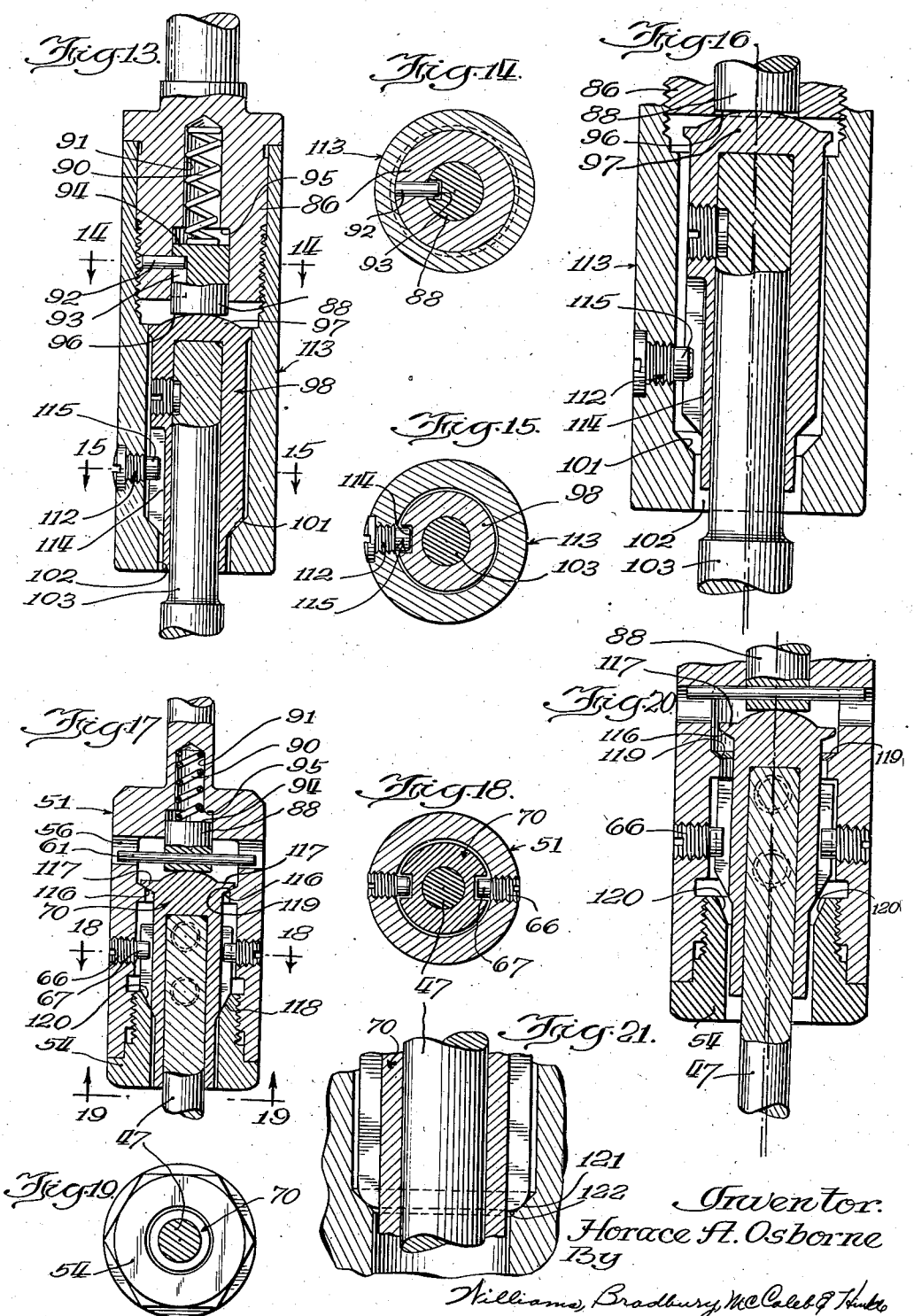

Patented Jan. 23, 1940

2,188,205

UNITED STATES PATENT OFFICE 2,188,205

FLOATING TOOL HOLDER

Horace A. Osborne, Racine, Wis., assignor, by mesne assignments, of two-fifths to Webster Electric Company, Racine, Wis., a corporation of Delaware Application September 30, 1937, Serial No. 166,499

4 Claims. (Cl. 279—16)

The present invention relates to floating tool holders, and is particularly concerned with providing a floating tool holder having a more effective means of alignment between a machine or power unit and the work upon which the operation is to be performed.

One of the objects of the invention is the provision of an improved floating tool holder which provides a maximum amount of lateral and angular floating motion for the tool, and which is simpler in construction than the devices of the prior art, requiring a minimum number of parts.

Another object of the invention is the provision of an improved floating tool holder which can be used to work with the tools closer together in a cluster, due to its small size and simple construction.

Another object of the invention is the provision of an improved floating tool holder so arranged for floating motion that it may have a purely lateral displacement, an angular displacement, or any combination thereof.

Another object is the provision of an improved floating tool holder which is adapted to be used principally with reamers for forming accurately sized holes, but which may also be used with drills, taps, and any other form of tool.

Another object is the provision of an improved floating tool holder in which the tool is automatically centered, due to the action of its parts while the tool is rotating, but not in use; that is to say, while it is idling.

Other objects and advantages of the invention will be apparent from the following description and the accompanying drawings, in which similar characters of reference indicate similar parts throughout the several views.

Referring to the drawings, of which there are four sheets:

Fig. 1 is an elevational view of a drill head provided with a plurality of arbors, a work support, and a jig, illustrating the use of the invention;

Fig. 2 is a side elevational view of a floating tool holder and a reamer constructed according to the invention, the dotted lines illustrating one limit of range of normal movement;

Fig. 3 is a fragmentary cross-sectional view, taken on a plane passing through the axis of the drive shaft of Fig. 1, showing the details of construction of two of the floating tool holders therein, the left one being in the inoperative position, and the right one being in use;

Fig. 4 is a horizontal sectional view, taken on the plane of the line 4—4 of Fig. 3, looking in the direction of the arrows;

Fig. 5 is a horizontal sectional view, taken on the plane of the line 5—5 of Fig. 3, looking in the direction of the arrows;

Fig. 6 is a view in perspective of the collet which forms a part of the floating tool holder;

Fig. 7 is a fragmentary sectional view similar to Fig. 2, showing a modified form of construction, with the tool in inoperative or idle position;

Fig. 8 is a sectional view, taken on the plane of the line 8—8 of Fig. 7, looking in the direction of the arrows;

Fig. 9 is a view similar to Fig. 7 of the same construction, showing the tool holder with the tool in operative position;

Fig. 10 is a view similar to Figs. 3 and 7 of another modification, with the tool in idle position;

Fig. 11 is a horizontal sectional view, taken on the plane of the line 11—11 of Fig. 10, looking in the direction of the arrows;

Fig. 12 is a fragmentary view similar to Fig. 10 and slightly enlarged, showing the tool in the position which it assumes when there is a lateral displacement of it relative to the drive shaft;

Fig. 13 is another fragmentary sectional view, taken through the tool holder, showing another modification;

Fig. 14 is a horizontal sectional view, taken on the plane of the line 14—14 of Fig. 13;

Fig. 15 is a horizontal sectional view, taken on the plane of the line 15—15 of Fig. 13;

Fig. 16 is a fragmentary view similar to Fig. 13, with the operating parts enlarged, showing the tool in operating position;

Fig. 17 is another view similar to Fig. 13 of another modification;

Fig. 18 is a sectional view, taken on the plane of the line 18—18 of Fig. 17, looking in the direction of the arrows;

Fig. 19 is a horizontal sectional view, taken on the plane of the line 19—19 of Fig. 17, looking in the direction of the arrows, showing the bottom of the tool holder;

Fig. 20 is an enlarged fragmentary view of the construction of Fig. 17, showing the tool in work-engaging position;

Fig. 21 is a fragmentary sectional view, taken on the plane of the axis of the tool, showing another modified form of construction of the lower end of the collet;

Fig. 22 is a view similar to Fig. 5 of a preferred modification like Fig. 5 except that it employs but one driving pin;

Figs. 23 and 24 are two more axial sectional views of another modification, the parts being shown in different positions;

Fig. 25 is an elevational view of one type of flexible drive.

Referring to Fig. 1, the numbers 10—13 indicate the floating tool holders constructed according to the invention and used upon the machine shown. 15 indicates the support or table for the work; 16, a back wall against which the jig 17 is positioned; 18 a standard for holding the head and drill press, 19 the gear housing for supporting the drive shafts 20—23 and for housing the gears which connect them.

The head or gear housing 19 is movably mounted on the standard 18, and may be moved up and down by turning the arbor 24 by means of the handle 25. The drive shafts 23 are driven from the motor 14 by means of the pulleys 26, 27 and belt 28, the auxiliary pulleys being provided for different power ratios, and by means of the handle 25 all of the tool holders 10—13 may be simultaneously raised or lowered with the head 19.

The jig 17 may comprise a rectangular cast metal supporting member provided with a foot 29 at each corner for engaging the flat upper surface 30 of the table. The rear side of the rectangular jig base 31 flatly engages the back wall 16, and determines the approximate proper position for the work on the table.

The jig base 31 is provided with an upwardly extending lug 32, which pivotally supports a retaining arm 33 for holding the work piece 34 in place. The work piece 34 might, for example, comprise the housing of a gear pump, which has in its finished condition a plurality of substantially parallel, vertically extending bores. The work piece 34 may be held in place by a pivot lever 35, pivotally mounted on the upwardly extending lug 36, and provided with a downwardly extending lug 37 for engaging the cam 38 of a cam lever 39.

The cam lever 39 is pivotally mounted on the base 31 by means of the screw bolt 40. When the cam lever is rotated toward the observer (Fig. 1), the lever 35 is pivoted in a clockwise direction to secure the work piece 34 in the jig.

The upwardly extending lug 36 also carries a pivotally mounted arm 41, which is provided with a multiplicity of bushings 42—45, located in proper position to receive the reamers or tools 46—49, which are to perform work on the work piece 34. The reamers 46—49 operate on previously drilled holes, and the various arms 41, 35 and 33 of the jig serve to either support the bushings in place or bring new bushings into place, or to secure the work piece in the jig. Thus the jig is adapted to provide one or more bushings which are in substantial alignment with the aperture which is intended to be formed in the work piece, and the floating tool holders 10—13 support the tools 46—49 in such manner as to permit the bushings 42—45 to align the tools 46—49. To accomplish this purpose in the best way, one hundred percent floating action is required in the tool holders 10—13, the construction of which will now be described.

Referring to Fig. 2, the tool holder 10, supporting the tool 46, is there shown in elevation. The tool holder is provided with a shank 50, which is adapted to be received in a chuck. All the customary types of drill or tool shanks may be used for the shank 50, such as straight shank, tapered shank, Glenzer, etc. The shank form 50 shown in Fig. 2 is merely one example of a conventional type of shank.

The shank 50 supports the substantially cylindrical head 51 of the tool holder 10, which may be relatively small, according to the present construction, and it is so small that tools may be operated very close to each other, in clusters, as shown in Fig. 1, so that a number of operations may be performed at the same time, with the tools very close together.

The body 51 of the tool holder is a substantially cylindrical integral enlargement of the shank 50. The body is provided with an internal cylindrical bore 52 and with a threaded counterbore 53 for receiving the closure plug 54. The bore 52 is relieved or increased in size at 54 and at its upper end 55, and the counterbore 55 is provided with the transverse apertures 56 communicating therewith.

Counterbore 55 communicates with a smaller bore 57 at the upper end of the housing for receiving a compression spring 58, which acts upon a cylindrical plunger 59, having an enlarged head 60. A pin 61 passing through the head 60 has its ends engaging in the aperture 56, and acts as a stop member to determine the limits of motion of the plunger 59. The annular surface 62 on the upper side of the head 60 (Fig. 3) engages the annular shoulder 63 in the housing before the pin 61 engages the upper side of the apertures 56, so that the load on the working tool is taken between the surface 62 and the surface 63, rather than at the pin 61.

The housing is also provided with one or more threaded transverse apertures 64, 65 for receiving the threaded driving screws 66. These driving screws comprise special steel members having a hardened tip 67, which may be of special shape, such as, for example, partially spherical. The body of each driving screw 66 is threaded to be received in the bores 64, 65, and is provided with a slot 68 for receiving a screw driver or other tools.

The tips 67 project into the bore 52 of the housing in position to engage in slots 69 in the collet 70. The collet 70 is shown in one form in Fig. 6, and it comprises a substantially cylindrical steel body, having an enlarged cylindrical portion 71 and a smaller cylindrical portion 72, joined by a frusto-conical portion 73. At its upper end it is provided with a cylindrical guide flange 74, joined to the cylindrical body 71 by a tapered or curved surface 75.

The guide flange 74 has a flat annular surface 76 on its upper side, but the collet has at its center side a partially ball-shaped formation 77 for engaging the flat surface 78 on the head 60 of the plunger.

The frusto-conical surface 73 is adapted to engage a complementary inner frusto-conical surface 78 at the upper end of the bore 79 of the screw plug 54. Bore 79 of screw plug 54 is large enough to provide a considerable clearance about the reduced cylindrical portion 72 of the collet, and the cylindrical body 70 of the collet has a considerable clearance inside the bore 52 of the body. This permits lateral, universal, and angular motion of the collet in the body, when the collet is moving in the direction that brings the surfaces 62 and 63 together.

The collet is also provided with an internal tool-shank-receiving bore 80 which may comprise a socket of any conventional shape adapted to receive a tool.

In the embodiment shown in Fig. 3, this is a cylindrical bore which has communication with a pair of laterally extending threaded bores 81. The threaded bores 81 receive set screws 83, which are sunk into the bores so that there are no projections when the set screws engage the shank 47, for example, of a tool. Thus, the tool shank is fixedly secured within the collet so that the tool is adapted to be supported and driven by the collet through the pins 66 and housing 51.

The operation of the tool holder is as follows: When the tools are withdrawn, above the work, so that the reamer is not engaging the work, there is no axial pressure on the reamer or other tool. Then the spring 58, acting on plunger 59, forces the collet 70 downward in its housing 51 until the frusto-conical surface 73 engages the inner frusto-conical surface 78. This effectively centers the collet and tool in the housing at the lower end of the collet, and a similar action takes place at the upper end of the collet, due to the curved surface 76. Thus the tool is substantially centered during its idling or non-operating condition, and there is practically no wabbling of the tool, as is present in some of the devices of the prior art, during the idling of the tool.

As soon as the tool is brought into engagement with a guide, or with the work, the axial pressure on the tool shank 47 forces the collet upward in its housing, compressing the spring 58, and lifting the frusto-conical seat 73 from the surface 78'.

Then the collet is free to move in any position required by the guide or by the bore of the work to be reamed, and the collet takes the position to which it is moved as a result of the action of the tool on the work. It may move angularly, laterally, or both. During this time it is driven by the drive screw 67 in the slots 69, and it is found that the work can be kept within very close limits of tolerance by the use of such a tool holder.

Referring to Fig. 7, this is a modification in which a different form of housing is employed, and a different form of driving member. In this case the cylindrical housing 85 is open at its upper end and provided with a threaded plug 86 which engages a threaded bore 87 in that end of the housing.

The threaded plug 86 slidably supports a cylindrical plunger or piston member 88 in a cylindrical bore 89, the plunger being engaged by a compression spring 90 in a counterbore 91. The limits of motion of the plunger 88 are determined by means of a stop pin 92 and a slot 93, but again the load is taken by the end 94 of the plunger engaging the annular seat 95. The flat lower end of the plunger 96 engages the ball-shaped formation 97' on the collet 98, and the collet has its guide flange 99 of such size that it fits in the bore 100.

The bore 100 communicates with a frusto-conical chamber 101, which communicates with a smaller bore 102 for passing the tool shank 103. In this case the collet has the partially cylindrical, laterally extending slots 104 for engaging the ball bearings 105.

The ball bearings 105 may be located in the partially cylindrical slots 106 which are formed by drilling into the housing 85 from the bottom to the desired point. The balls 105 are held in place by the pins 107 which are a drive fit in the apertures 108 extending transversely into the bore 106.

It will be noted that there is a clearance between the slots 104 and the balls 105, which aids in giving the collet still more freedom of motion.

The operation of this embodiment is the same as that previously described, except that it is driven by means of the balls 105 in the slots 104.

Fig. 9 shows one of the extreme positions which the collet and tool may take in the housing when it is engaging the work.

Referring to Fig. 10, this is another modification in which the structure of the housing, plunger and plug are the same as just described, but the collet is provided with the substantially rectangular longitudinally extending slots 109 for engaging the key members 110, which are of similar shape.

The key members 110 may have a drive fit in the slots 111 in the housing 85. It will be noted that there is a clearance between the key members 110 and the slots 109 of the collet in this case.

Fig. 12 shows the freedom of motion of the collet within its housing in a tool holder of this construction.

Referring to Fig. 13, this is another modification, in which there is but a single drive pin 112 located in the housing 113. The collet is provided with a single slot 114, which is of greater width than the hardened end 115 of the pin 112.

The other elements may be substantially as described with respect to Figures 7 and 10, but it will be noted that when only a single pin is provided there is a possibility of still greater freedom of motion of the collet within its housing.

I desire it to be understood that any of the embodiments of the preceding later figures may also be constructed with but a single driving pin, ball, key, or the like.

Referring to Fig. 17 this is another modification, in which the collet is provided with a frusto-conical flange 116, underneath its head 117, as well as the frusto-conical surface 118 at the bottom. In this case the housing has a frusto-conical surface 119 and another frusto-conical surface 120 in the lower plug. These frusto-conical surfaces effect a close centering of the collet in the tool holder while the tool is idling, but as soon as the tool is brought into use and axial pressure on the tool is exerted, the collet is lifted from its seat, as shown in Fig. 20.

Referring to Fig. 21, this is another modification, in which the collet is provided with a lower curved annular surface 121 for engaging the frusto-conical surface 122, to effect a centering of the collet.

I desire it to be understood that the present tool holders need not always be used with jigs, but, when no jig is used, the tool will be aligned by means of a drilled hole within which the tool is worked.

Referring to Fig. 22, this is a section similar to Fig 5, of a similar modification, in which only one driving pin 67 is used. This is one of the preferred embodiments.

It should also be noted that a clearance is necessary around all driving pins, keys, or balls.

Referring to Figs. 23 and 24, these are axial sectional views of another modification.

In Fig. 23 the parts are shown in the position which they assume when the axis of the collet is substantially parallel to that of the housing.

In Fig. 24 the parts are shown in another position, with the axis of the collet at an angle to the axis of the housing.

This modification preferably includes a threaded body 140, provided with a shank 141, the threaded body 140 also having a cylindrical outer surface 142 and a reduced threaded cylindrical portion 143. The reduced threaded portion 143 has an axial bore 144 with a clearance about a flexible drive shaft 145, the enlarged bore 144 terminating in a non-circular socket 146. The body or housing 147 comprises a metal member having an outer cylindrical form and having an inner cylindrical bore 148 which is provided with a threaded portion 149 adapted to engage the threaded portion 143. The shank body 142 and housing 147 may have complementary cylindrical surfaces at 150, 151, and the cylindrical chamber 148 terminates in a frusto-conical portion 152 leading to a cylindrical enlarged aperture 153.

The cylindrical chamber 148 may also be provided with an annular groove 154 surrounding the headed portion 155 of the collet 156 to provide a suitable clearance. The collet 156 comprises a cylindrical metal member which is provided with the cylindrical headed portion 155 at its upper end, the headed portion 155 being a sliding fit in the cylindrical bore 157 so as to effect a centering of the collet when it moves downward in the housing 147.

The collet has a non-circular socket 158 in its upper end for receiving the lower end of the drive shaft 145, and it also has a cylindrical recess 159 for providing a seat for the spring 160, which surrounds the drive shaft 145.

In its lower end the collet 156 is provided with a suitable socket 161 and with a set screw 162 for securing the shank 163 of a suitable tool in the collet, such as a drill or reamer. The lower frusto-conical portion 164 of the collet cooperates with a frusto-conical surface 152 to effect a centering of the collet when it is moved downward until these surfaces come into engagement with each other. There is also a tapered surface between the headed portion 155 and the cylindrical outer surface of the collet 156.

The body 140 may have a flat end surface 165 for engaging the upper face of the washer 166, which is a part of a thrust bearing including the balls 167, which are confined by a cage. The balls 167 also engage the lower washer 168, which also has upper and lower flat surfaces engaged by the upper end of spring 160.

There is a suitable clearance about the edges of the washers 166, 168 so that the lower washer may move toward the left or right, or in any direction to which it may be impelled by the irregular motion of the collet 156 with a minimum amount of friction. The drive shaft 145 has a tight fit in its upper socket 146, but a loose sliding fit in its lower socket 158, and the lower socket 158 is of sufficient depth so that the collet may move axially with respect to this end of the drive shaft until the end 169 engages the lower face of the washer 168.

The drive shaft 145 may consist of a flexible steel shaft member of twisted strands of steel wire, formed with straight or twisted strands in the center and covered with a helical coil of twisted steel wire on the outside, as shown in Fig. 5. The ends of the shaft are squared by application of hammering or pressing so that they fit in the squared sockets 146, 158. The drive shaft may in some embodiments also be constructed of hard rubber or fiber provided at each end with steel collars and reinforced with suitable steel wires.

It will thus be observed that in this embodiment the collet is driven by means of a flexible shaft connection.

The operation of this floating tool holder is substantially the same as those previously described, and when the tool is in idling position, without any axial pressure on the tool, the collet is centered in its housing. When axial pressure is placed upon the tool carried by the collet, the collet is driven from its seat, the spring 160 is compressed, and the upper end 169 of the collet engages the lower washer of the thrust bearing.

It will thus be observed that I have invented an improved tool holder which gives a lateral float, a parallel float, and an angular float to a tool. The present tool holder is so simple that it requires a minimum number of parts, and may be constructed more economically than the devices of the prior art. Due to its small size, the tool holders can be worked closely together, in clusters, and may be used with or without jigs. It is used mainly with reamers, to produce accurate sized holes, but it may be used with drills, taps, or any other tool which should not be firmly and fixedly supported. The present tool holder is adapted to permit the machining of parts to closer tolerances than the devices of the prior art, at a lower cost.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a floating tool holder, the combination of an elongated housing member provided with an internal axially extending bore having said bore open at one end with a supporting shank carried by said housing at its opposite end for securement of the tool holder in a chuck or the like, a floating collet located in said bore and having means for securing the shank of a tool in said collet, said housing having at its open end an inner frusto-conical surface surrounding a centrally located opening and leading to the bore in which said collet is located, said collet having a clearance in said bore whereby the collet is adapted to have lateral and angular floating movement in said bore and said collet having a complementary frusto-conical surface at the tool supporting end thereof for engagement with the first mentioned frusto-conical surface in said housing, spring means carried by said housing and urging said collet axially of said housing to bring said frusto-conical surfaces into engagement with each other and to center said collet and the tool held thereby when the tool is not engaging a workpiece, and driving means between said collet and said housing of a universal character adapted to permit the axial, lateral and angular floating movement of said collet whereby when the tool engages a workpiece the collet is lifted from its frusto-conical seat in the housing and adapted to be rotated while assuming the position impressed upon it by a guide member engaging said tool said housing including an anti-friction thrust bearing between said collet and the closed end of said housing and said drive means extending through said anti-friction bearing, said drive means comprising a flexible shaft formed of spirally twisted wire having one end carried by said housing and the opposite end engaged in said collet for sliding movement while rotating said collet.

2. In a floating tool holder, the combination of a housing provided with a shank adapted to be secured in a chuck or the like, said housing being provided with an axial bore having an opening at its lower end for passage of a tool shank, and said housing having in said bore a pair of annular centering surfaces, a floating collet in said housing comprising a metal member having an axially extending bore for receiving the shank of a tool, means for securing said shank in said bore, said collet having a pair of axially spaced, annular, tapered centering surfaces located to engage the annular centering surfaces carried by said housing, and universal driving means for connecting the inner end of said collet to said housing, whereby the collet is adapted to be automatically centered by said annular surfaces and tapered surfaces upon removal of any axial thrust on the tool carried by said collet, and said collet is adapted to have full lateral and annular floating movement while being driven by said housing upon the application of an axial thrust to the tool carried by said collet, and resilient means in said housing for urging said collet axially in said housing in such a direction as to bring the tapered surfaces in said collet into engagement with the adjacent annular surfaces of said housing to effect a centering of the collet and the tool carried thereby, upon removal of axial thrust from the tool, and anti-friction bearing means interposed between the end of said housing and said collet for taking the thrust placed upon said collet when there is an axial thrust upon the tool carried by said collet.

3. In a floating tool holder, the combination of a housing provided with a shank adapted to be secured in a chuck or the like, said housing being provided with an axial bore having an opening at its lower end for passage of a tool shank, and said housing having in said bore a pair of annular centering surfaces, a floating collet in said housing comprising a metal member having an axially extending bore for receiving the shank of a tool, means for securing said shank in said bore, said collet having a pair of axially spaced, annular, tapered centering surfaces located to engage the annular centering surfaces carried by said housing, and universal driving means for connecting the inner end of said collet to said housing, whereby the collet is adapted to be automatically centered by said annular surfaces and tapered surfaces upon removal of any axial thrust on the tool carried by said collet, and said collet is adapted to have full lateral and annular floating movement while being driven by said housing upon the application of an axial thrust to the tool carried by said collet, said collet and said housing having opposite, non-circular sockets therein, and said universal driving means comprising a relatively stiff yet flexible shaft of coiled wire.

4. In a floating tool holder, the combination of a housing provided with a shank adapted to be secured in a chuck or the like, said housing being provided with an axial bore having an opening at its lower end for passage of a tool shank, and said housing having in said bore a pair of annular centering surfaces, a floating collet in said housing comprising a metal member having an axially extending bore for receiving the shank of a tool, means for securing said shank in said bore, said collet having a pair of axially spaced, annular, tapered centering surfaces located to engage the annular centering surfaces carried by said housing, and universal driving means for connecting the inner end of said collet to said housing, whereby the collet is adapted to be automatically centered by said annular surfaces and tapered surfaces upon removal of any axial thrust on the tool carried by said collet, and said collet is adapted to have full lateral and annular floating movement while being driven by said housing upon the application of an axial thrust to the tool carried by said collet, said bore in said housing having cylindrical portions located at each end of said collet, and said collet being substantially cylindrical, with a cylindrical flange at its inner end adapted to have a substantial fit in the cylindrical portion of said bore.

HORACE A. OSBORNE.